United States Patent [19]
Murakami

[11] Patent Number: 5,632,454
[45] Date of Patent: May 27, 1997

[54] CONTINUOUS FILM TAKE-UP APPARATUS

[75] Inventor: Motoaki Murakami, Wakayama, Japan

[73] Assignee: Noritsu Koki Co., Ltd., Wakayama, Japan

[21] Appl. No.: 412,740

[22] Filed: Mar. 29, 1995

[30]   Foreign Application Priority Data

Mar. 30, 1994   [JP]   Japan .................................. 6-060691

[51] Int. Cl.$^6$ .................................................. B65H 18/10
[52] U.S. Cl. ..................... 242/530.2; 242/532.7; 242/528; 242/534.2
[58] Field of Search ..................... 242/530.2, 532.7, 242/534, 534.2, 535, 535.2

[56]   References Cited

U.S. PATENT DOCUMENTS

| | | | |
|---|---|---|---|
| 1,230,941 | 6/1917 | Sundh | 242/532.7 |
| 1,346,356 | 7/1920 | Wenderhold | 242/532.7 |
| 2,965,325 | 12/1960 | Hall | 242/530.2 |
| 3,715,087 | 2/1973 | Schmidt | 242/534 |
| 3,802,085 | 4/1974 | Shoonmaker . | |
| 3,913,367 | 10/1975 | Galletti | 242/532.7 |
| 4,010,912 | 3/1977 | Dreher et al. | 242/534 |
| 4,175,713 | 11/1979 | Jores | 242/532.7 |
| 4,534,518 | 8/1985 | Kashiwaba | 242/532.7 |
| 4,609,161 | 9/1986 | Weyand, Jr. | 242/530.2 |
| 4,770,361 | 9/1988 | Maeda | 242/532.7 |
| 4,957,247 | 9/1990 | Nakamura et al. | 242/532.7 |
| 5,227,827 | 7/1993 | Murakami . | |
| 5,238,198 | 8/1993 | Jingu et al. | 242/532.7 |
| 5,544,840 | 8/1996 | Murakami | 242/532.7 |

*Primary Examiner*—John P. Darling
*Attorney, Agent, or Firm*—Wenderoth, Lind & Ponack

[57]   ABSTRACT

A continuous film take-up apparatus for taking up a plurality of films includes a guide/feeder unit and a drive unit. The guide/feeder unit includes a tilt guide for guiding the film. A film take-up amount detection unit detects the amount of film taken up by detecting the inclination of the tilt guide.

3 Claims, 11 Drawing Sheets

CONTINUOUS FILM TAKE-UP APPARATUS

BACKGROUND OF THE INVENTION

The present invention relates to a continuous film take-up apparatus for taking up a plurality of films in succession into a film magazine.

For efficiently printing onto a photographic film in a photographic printing apparatus, the film is fed to a printer continuously from a film magazine in which a plurality of films spliced with one another using adhesive tapes are wound on a reel.

For taking up the films into the film magazine, a conventional method includes splicing the films by hand and manually winding the films into the film magazine. However, such manual operations of splicing films and taking them up in the film magazine require considerable amounts of time and labor and efficiency cannot be increased.

We, the inventors of the present invention, have developed and proposed a continuous film take-up apparatus for feeding a plurality of films in succession to a photographic printing apparatus. The continuous film take-up apparatus allows the films to be continuously wound on a reel without splicing as with the conventional manner. In particular, the leading end of each film is placed not over but under the trailing end of a preceding film so that the films can be fed by friction out of the film magazine.

The continuous film take-up apparatus does not provide for overlapping the films with the leading end of a film placed under the trailing end of the preceding film automatically. This requires a manual operation which is not efficient.

Even if the continuous film take-up apparatus satisfying the abovesaid demands becomes attainable, it would be necessary to know in advance the maximum overall length of film which can be fed into the film magazine.

If a mechanism is provided to measure the overall film length precisely, such mechanism will increase cots and complicate operation. What is needed is to know only a limit amount over which the film cannot be wound further. There is no need to know changes in the amount of film taken up moment by moment.

An object of the present invention is to provide a continuous film take-up apparatus having a film take-up amount detection means which is economical and simple in structure, and can detect a limit over which the film cannot be wound further.

SUMMARY OF THE INVENTION

According to the present invention, there is provided a continuous film take-up apparatus for taking up a plurality of films onto a film magazine having a take-up reel. The apparatus includes a guide/feeder means for guiding and feeding a plurality of films into the film magazine, and a drive means for driving the take-up reel for the film magazine. The guide/feeder means moves towards the film magazine to place a leading end of a film under a film hold-down plate of the reel or a trailing end of a preceding film wound on the reel and then moves away from the film magazine while lifting up the trailing end of the preceding film from the reel. The guide/feeder means includes a tilt guide for guiding the film. Film take-up amount detection means detects the amount of film taken up by detecting the inclination of the tilt guide which changes as the film is taken up.

According to the present invention, as a plurality of film webs are wound up in the continuous film take-up apparatus, the diameter of the film roll increases, and the leading end of the tilt guide together with its inclination change gradually. The inclination of the tilt guide is optically detected by the detection means. The amount of film taken up can be detected by a signal output by the detection means. The detection means is economical and simple in structure. Thus, an upper limit of the amount of film that can be taken-up can be reliably detected.

Other features and objects of the present invention will become apparent from the following description made with reference to the accompanying drawings, in which:

DETAILED DESCRIPTION OF THE PREFERRED EMBODIMENT

Figure 1:
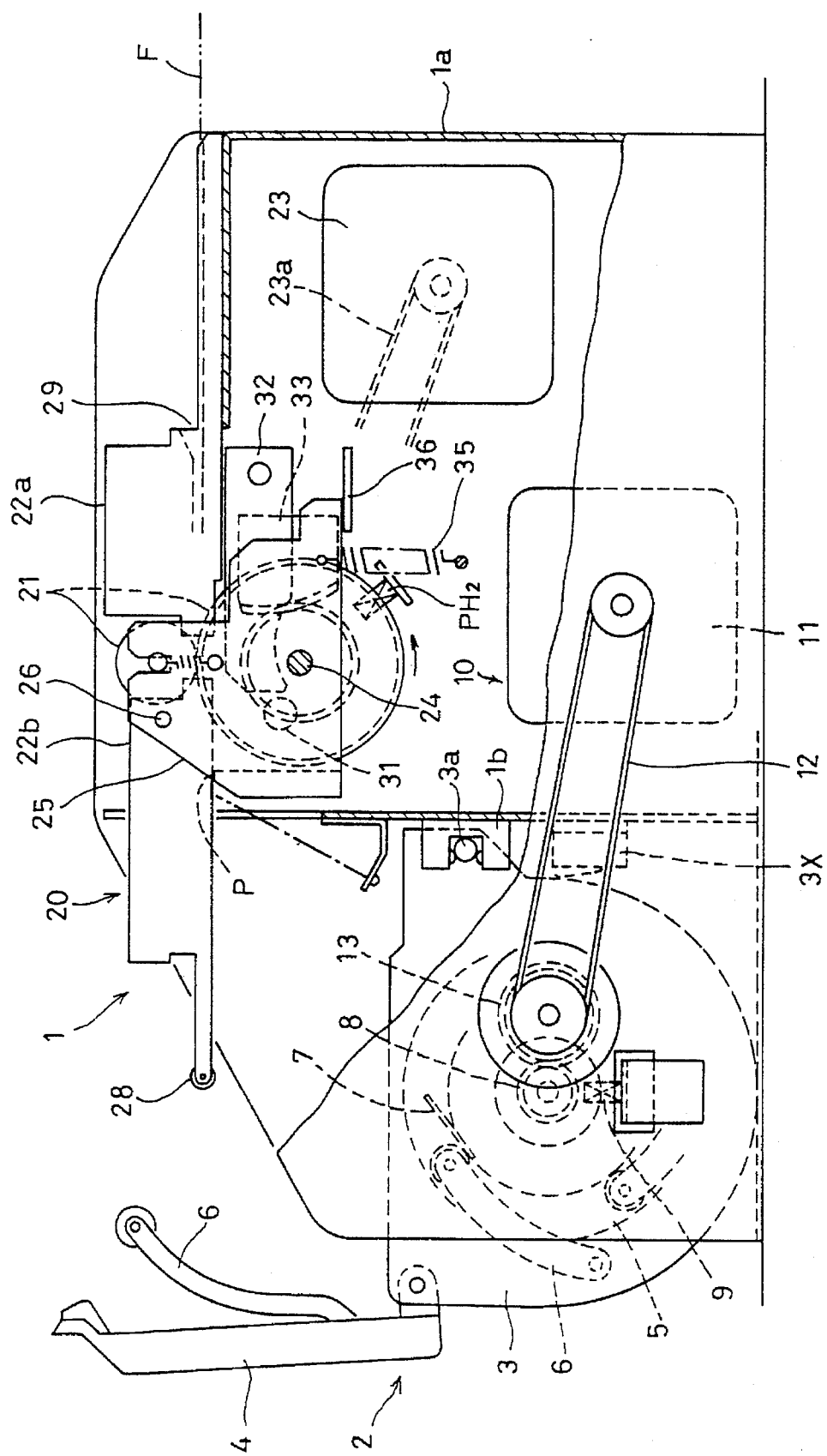
FIG. 1 is a schematic view of a continuous film take-up apparatus according to one embodiment of the present invention.

FIG. 1 is a schematic view of the entire arrangement of a continuous film take-up apparatus 1 according to the present invention. The apparatus 1 is installed in an outer casing which is not shown for simplification of description. The continuous film take-up apparatus 1 allows a film magazine (film supplier) 2 to be detachably mounted thereon. The film magazine 2 is not limited to the shape shown.

The film magazine 2 comprises a magazine casing 3, a cover 4, a magazine reel 5 on which films F are wound, and a film hold-down 6, reel 5 and hold-down 6 being contained in the magazine casing 3. The film magazine 2 is loaded from the left side to a C-shaped space of an inner casing 1a of the continuous film take-up apparatus 1 as shown in FIG. 1. In order to detachably mount the film magazine 2, a pin 3a mounted to the front end of the magazine casing 3 is coupled to a receptacle 1b provided on the innermost side wall of the C-shaped space of the inner casing 1a. There are also shown a film hold-down plate 7, a gear 8 mounted on one side of the magazine casing 3, a reel detector 9 and a magazine sensor switch 3X.

The film take-up apparatus 1 comprises a drive unit 10 for rotating the magazine reel 5 in the film magazine 2 and a guide/feeder unit 20 for guiding and feeding the film into the film magazine 2. The drive unit 10 transmits power from a take-up drive motor 11 via a belt 12 to a drive gear 13. As the drive gear 13 rotates the gear 8, the magazine reel 5 takes up the film F.

The guide/feeder unit 20 comprises a pair of feed rollers 21 for feeding the film F and a guide 22 for guiding the film F. The feed rollers 21 are driven through a roller shaft 24 by a motor 23. The lower one of the feed rollers 21 is connected through a one-way clutch 24a (FIG. 8) to the roller shaft 24 for rotation only in the direction of the arrow shown in FIG. 1. The guide 22 comprises an infeed guide 22a and a tilt guide 22b. The latter is driven by a part of the power of the motor 23.

Figure 2:
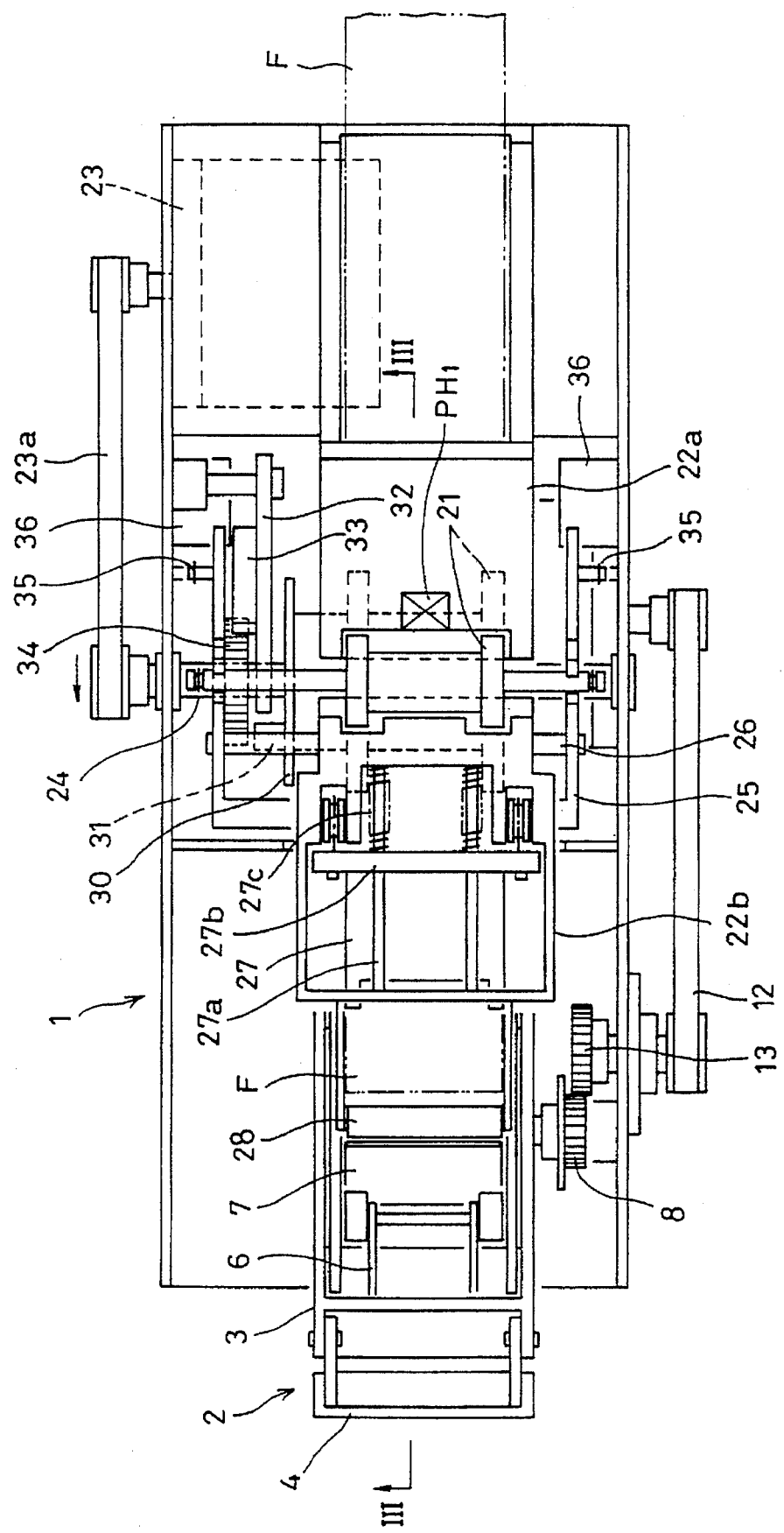
FIG. 2 is a plan view of the same.

The infeed guide 22a is fixedly mounted to a side plate of the inner casing 1a. A substantially C-shaped guide bracket 25 is pivotably mounted at both sides on the roller shaft 24 which extends crosswise through two side plates of the inner casing 1a (as shown in FIG. 2). The sides of the guide bracket 25 are formed in a rectangular shape. The upper feed roller 21 and the tilt guide 22b are mounted on the guide bracket 25. The tilt guide 22b is pivoted around a support pin 26. When the guide bracket 25 is in horizontal position (FIG. 1), the tilt guide 22b is supported to extend horizontally point P of the guide bracket 25. Tilt guild 22b downwardly when the guide bracket 25 turns.

Figure 3:
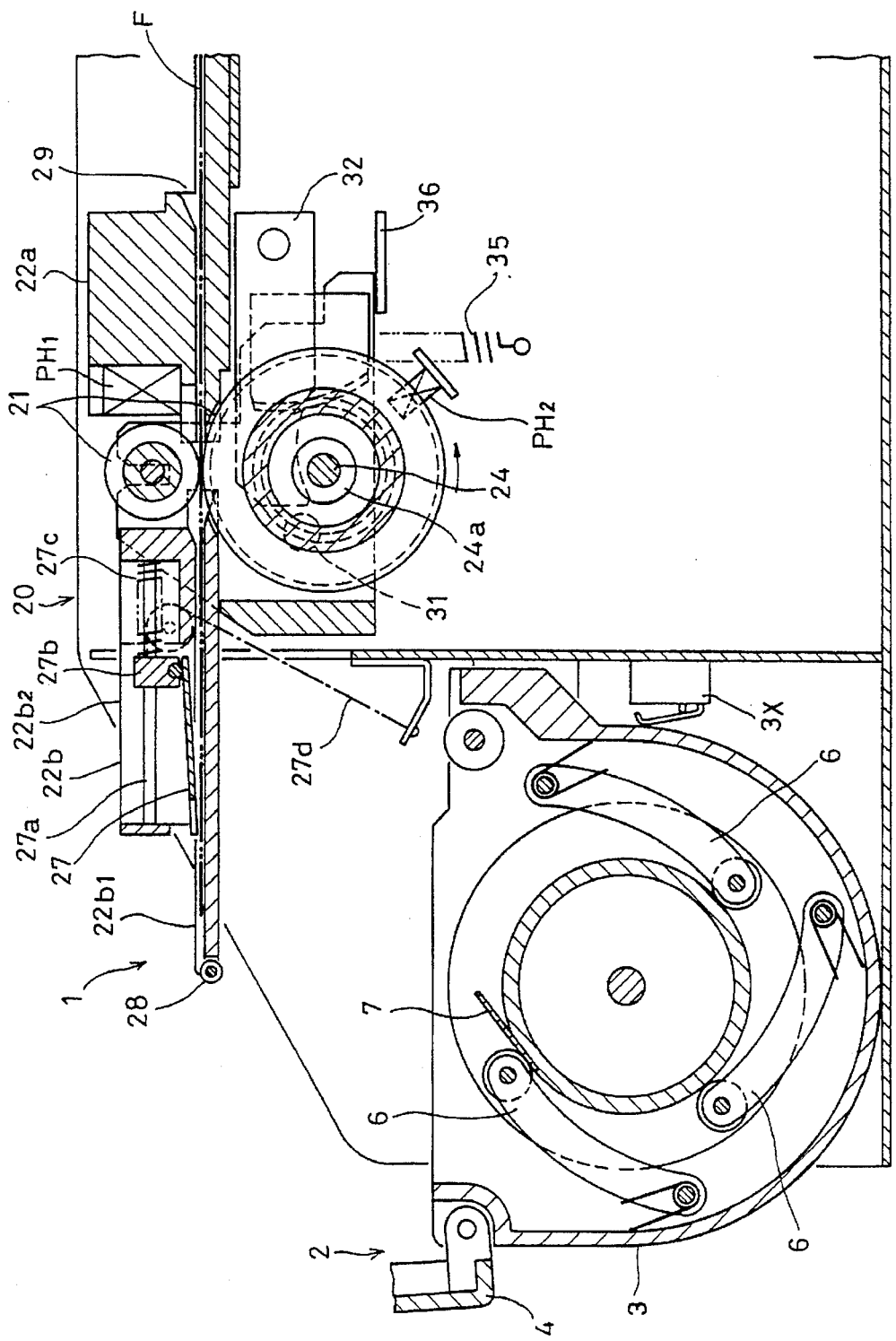
FIG. 3 is a cross sectional view taken along line III—III of FIG. 2.

The tilt guide 22b comprises a guide frame $22b_1$ for guiding the film F and a guide box $22b_2$ placed over the guide frame $22b_1$, as shown in FIG. 3. A film hold-down 27 is provided in the guide frame $22b_1$ so as to project and retract from the front end of guide box $22b_2$ while being slightly movable up and down.

The film hold-down 27 is pivotally pinned to a guide block 27b which is slidably mounted on a guide rod 27a extending through the guide box $22b_2$. The guide block 27b is tensioned by wires or ropes 27d so that it can resist against the yielding force of springs 27c, as shown in FIG. 3. Also, a guide roller 28 is mounted to a front end of the guide frame $22b_1$.

When the tilt guide 22b is tilted with its front end (or left end in FIGS. 1 and 3) moving downward, the ropes 27d will slacken and allow the springs 27c to expand. As a result, the film hold-down 27 will project from the guide box $22b_2$. The infeed guide 22a has a film inlet 29 provided in the upstream end thereof and a photoelectric sensor PH1 to detect the leading and trailing ends of the film F transferred through the film inlet 29.

As shown in FIG. 2, a detect disk 30 is disposed beside the lower feed roller 21 to detect the rotation of the roller and has a roll 31 mounted to the side thereof. An arm 32 is mounted so as to be pivotable around a pin secured to the inner casing 1a. As the detect disk 30 rotates with the feed roller 21, the roll 31 is turned counter-clockwise to come into contact with an arcuate end of the arm 32 and lift up the arm 32.

A toothed plate 33 with a gear formed on part equivalent to ⅛ of a circle is fixedly mounted to the side of the arm 32. Also, a gear 34 arranged in mesh with the toothed plate 33 is fixedly mounted to the guide bracket 25 so as to be rotatable relative to the roller shaft 24. In operation, when the arm 32 is turned by the movement of the roll 31, the gear 34 rotates to tilt the guide bracket 25. On the guide bracket 25, a return spring 35 is disposed vertically to hold back such rotation. In addition, a stopper 36 is mounted to the inner casing 1a to limit rotation of the guide bracket 25 back to its original state or position.

The detect disk 30 has an aperture provided in a flange portion thereof and a photoelectric sensor PH2 is provided at a corresponding position.

The operation of the continuous film take-up apparatus will now be explained.

First, the film F is fed through the film inlet 29 into the apparatus (until it reaches between the two feed rollers 21). Upon detection of the leading end of the film F by the photoelectric sensor PH1, the motor 23 will start rotating. The rotation of the motor 23 is transmitted via belt 23a to the roller shaft 24 which in turn rotates the detect disk 30 and the feed rollers 21. The roll 31 on the detect disk 30 will be moved from its original position shown in FIG. 1 in the counter-clockwise direction until it hits the arm 32. As the roll 31 moves further, the arm 32 will start tilting about its pivot pin.

Figure 4:
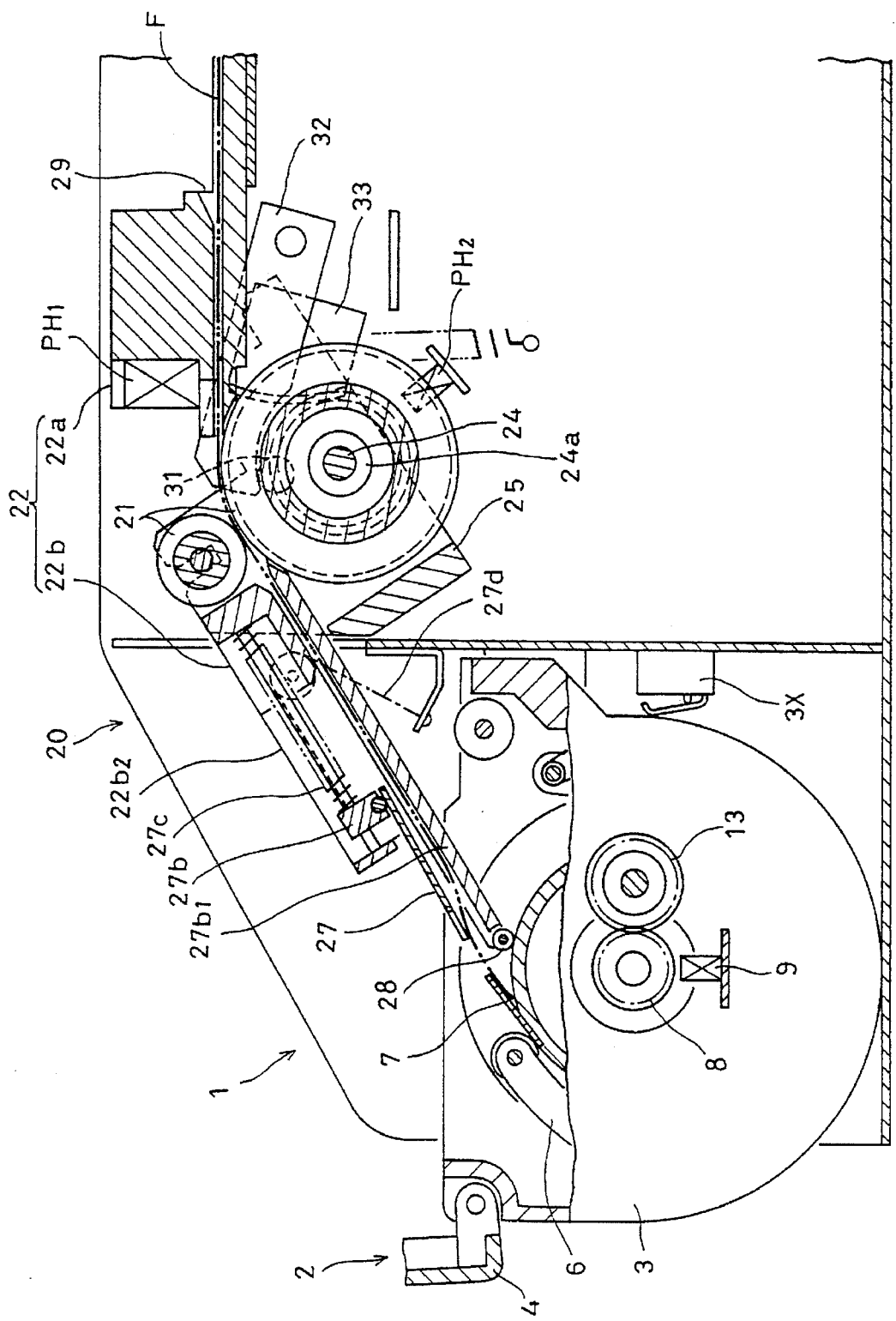
FIGS. 4, 5 and 6 are explanatory views showing how such apparatus operates.

Then, the toothed plate 33 coupled to the arm 32 turns about the pin and rotates the gear 34. The guide bracket 25 linked to the gear 34 is thus turned (or tilted) about the roller shaft 24 until it comes to the position shown in FIG. 4 (the stop position can be preset by determining the number of pulses for the motor 23). Before the tilt guide 22b tilts, the film F is fed to about 15 mm from the front end of the tilt guide 22b. When the guide roller 28 reaches the magazine reel 5, the film F comes to the front end of the tilt guide 22b. (This feeding amount can be determined by the diameter of the feed roller 21 and its rotating angle). As the feed rollers 21 further rotate, the film F passes under the film hold-down plate 7 and loosens as shown in FIG. 4.

When the tilt guide 22b tilts, the film hold-down 27 will slide and protrude from the guide box $22b_2$ of the tilt guide 22b to hold the leading end of the film F to avoid curling of the film.

The film hold-down 27 is mounted to the guide block 27b so as to be slightly turnable about the pin. When the tilt guide 22b tilts, the guide block 27b tensioned by the ropes 27d is pressed forward by the springs 27c to move out from the guide box $22b_2$.

When the tilt guide 22b stops tilting, the take-up drive motor 11 will start rotating to transmit rotation through the belt 12 to the drive gear 13. The drive gear 13 will mesh with the gear in the film magazine to rotate the magazine reel 5.

When the trailing end of the film F is detected by the photoelectric sensor PH1, the take-up motor 11 will stop after feeding a predetermined amount and cease the winding operation. The motor 23 starts and drives the roll 31 to its original angular position (FIG. 1) and simultaneously, the tilt guide 22b and the guide bracket 25 are returned back by the operation of the return spring 35 (until the guide bracket 25 hits the stopper 36 and the tilt guide 22b extends horizontally).

Figure 5:
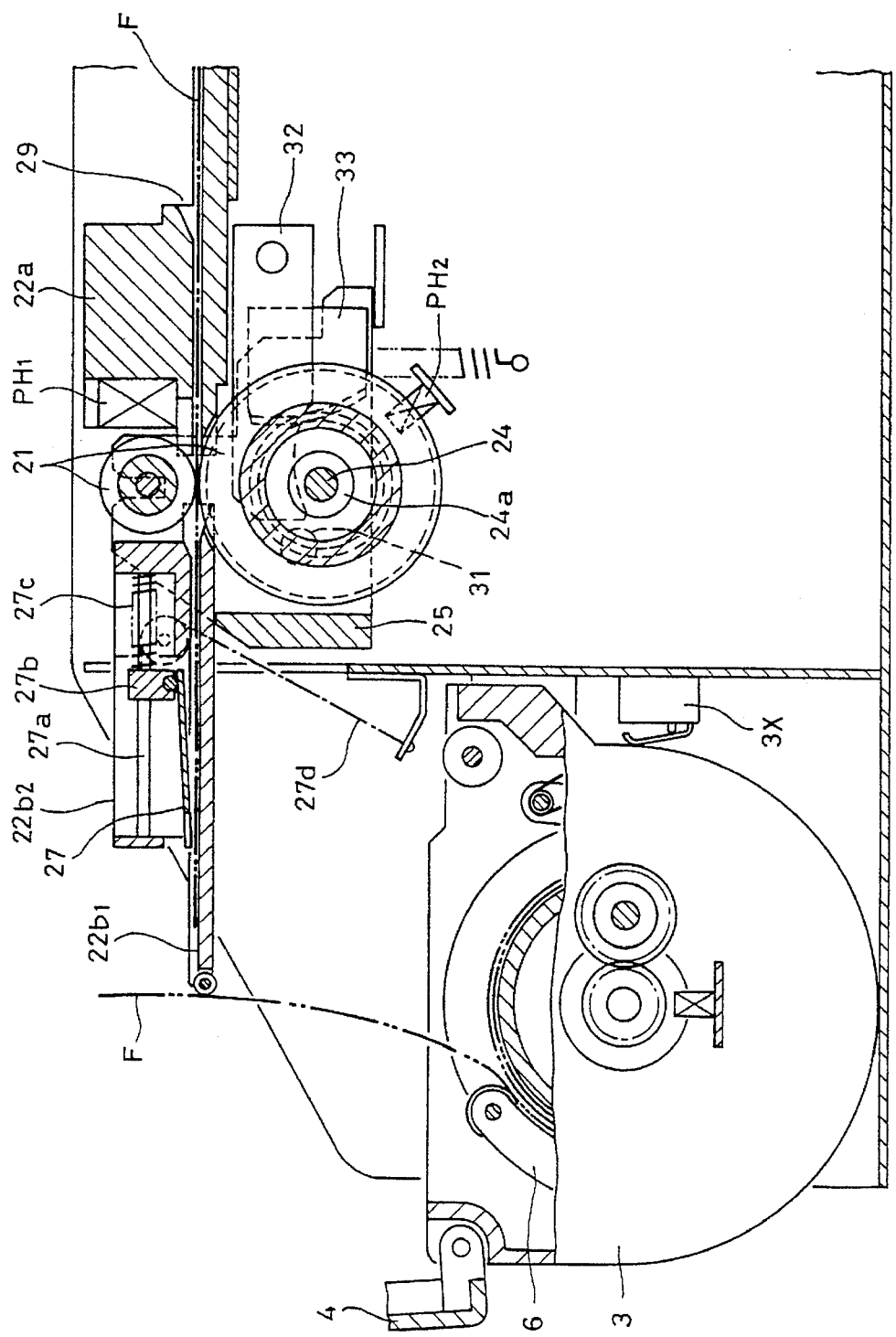

By then, the trailing end of the film F has passed the tilt guide 22b but stays at the guide roller 28 as shown in FIG. 5.

Figure 6:
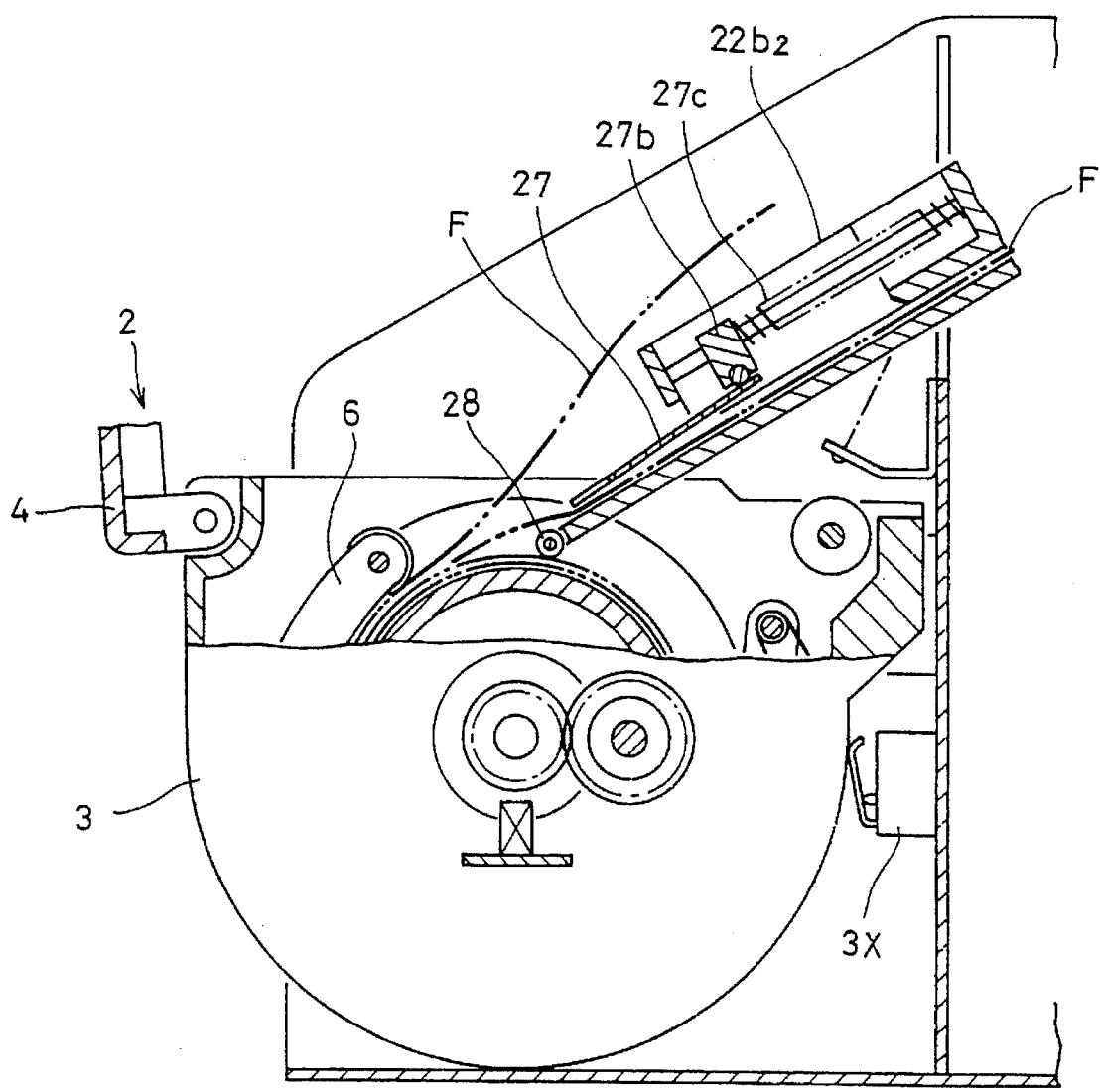

Accordingly, when the succeeding film is fed as described, it will be inserted come under the preceding film F as shown in FIG. 6 due to the initial operation of the apparatus. The take-up operation can then be commenced by starting the take-up drive motor 11.

As a plurality of the films are wound on the magazine reel 5 in the same manner, the guide roller 28 at the front end of the tilt guide 22b touches the film roll at a higher location thus allowing the tilt guide 22b to move a lesser distance about the support pin 26.

For resetting the magazine reel 5 and the tilt guide 22b, the take-up drive motor 11 and the film feed motor 23 are started by pressing a standby switch mounted on the outer casing (not shown). Then, through detecting the aperture in the gear 8 with the reel detector 9, the film hold-down plate 7 is placed at its initial position as shown in FIG. 2. Similarly, upon the photoelectric sensor PH2 detecting the aperture in the detect disk 30, the roll 31 is halted at its original position.

When the film magazine 2 (film supplier) is fully loaded with films, it is unloaded from the continuous film take-up apparatus and may be set to the film feeder inlet of a photographic printing apparatus for feeding of the films without loss of time.

Figure 7:
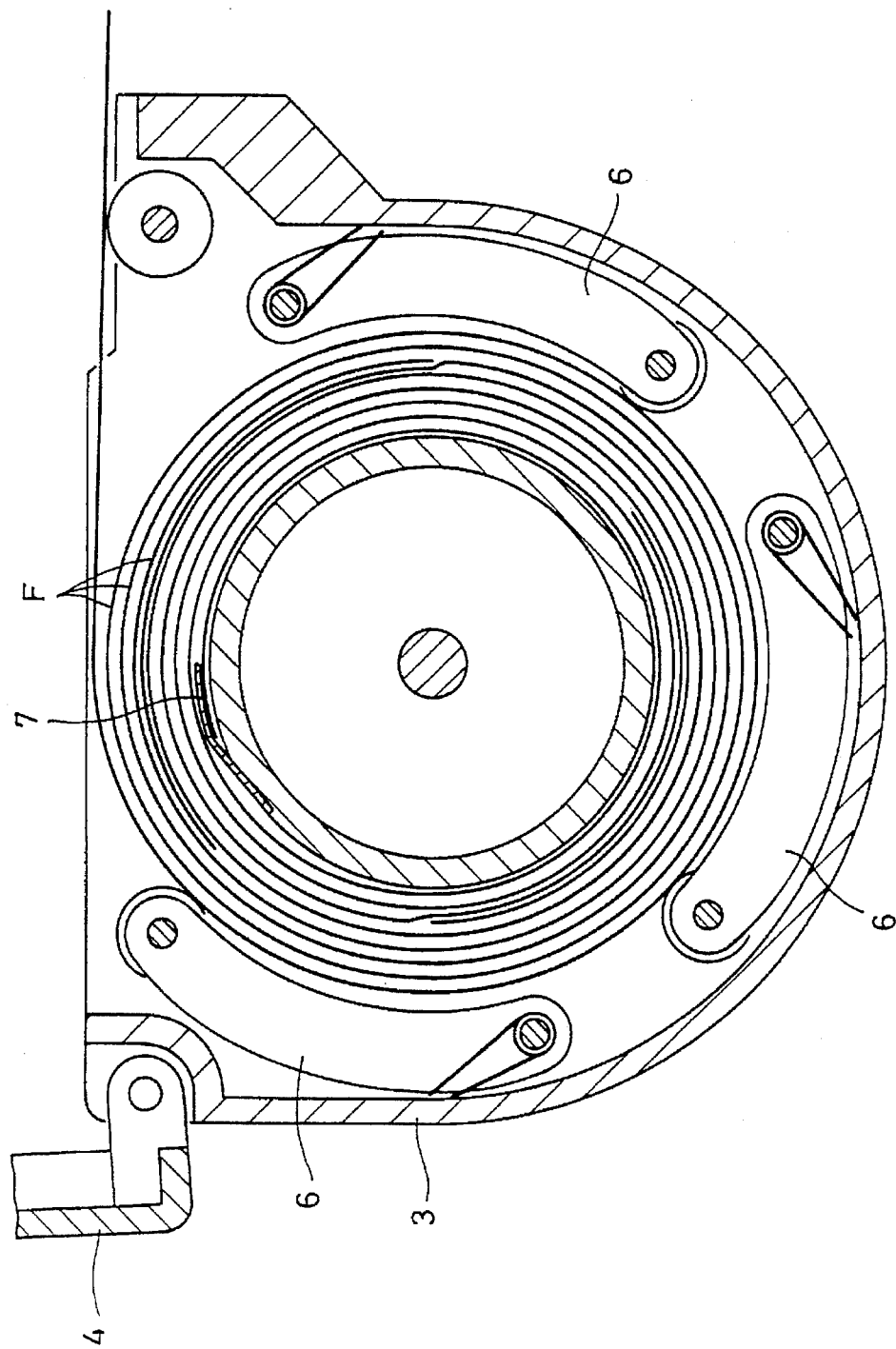
FIG. 7 is a schematic view showing the taking up of a film in a film magazine.

A plurality of films are stored in the film magazine 2, as shown in FIG. 7, with the leading end of each film being overlapped with, and more particularly placed under, the trailing end of a preceding film. As the result, a leading end of every film can be released from the film magazine 2 as it is driven by friction with the trailing end of the preceding film. Hence, a troublesome film splicing operation such as is necessary in the prior art can be eliminated.

It is understood that the present invention is not limited to the guide/feeder unit of the embodiment where the leading end of the film is placed under the trailing end of the preceding film with the tilt guide 22b being tilted down about the pivot pin towards the film magazine 2 but any other appropriate method may be utilized in the guide/feeder unit.

For example, a linear guide in the guide/feeder unit may be is provided in a tilted form for moving to and from the film inlet of the film magazine 2 so that its front end when moving away from the film magazine 2 can draw back in the upper rear direction to lift up the trailing end of a taken-up film.

Figure 8:
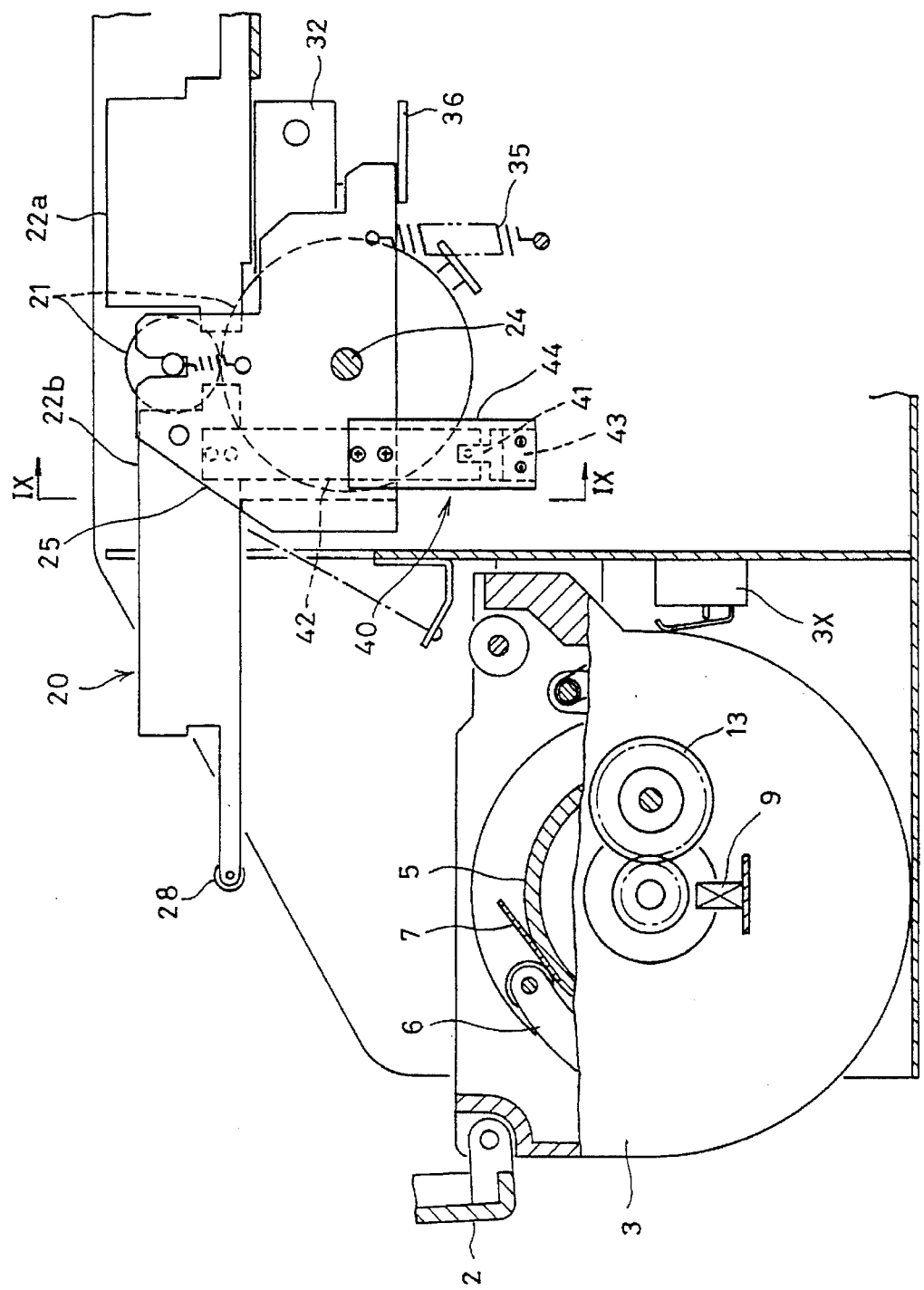
FIG. 8 is a schematic view of another embodiment in which a film take-up amount detection unit is provided.
Figure 9:
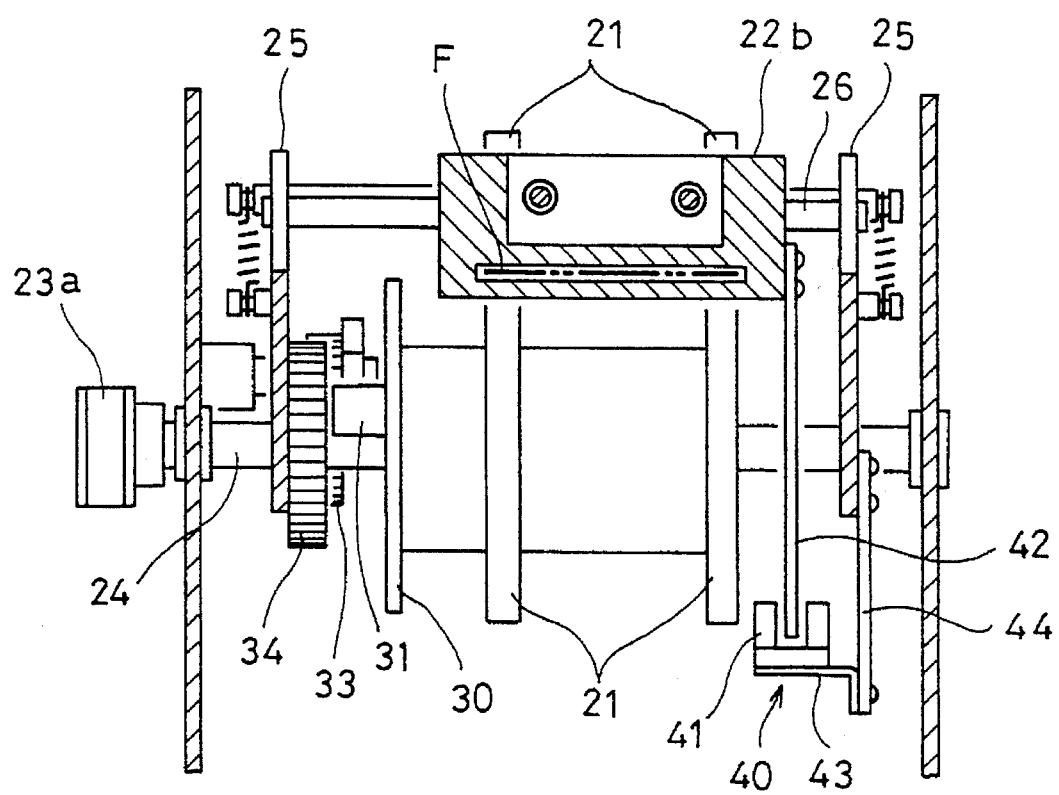
FIG. 9 is a sectional view taken along line IX—IX of FIG. 8.

FIG. 8 shows another embodiment in which a film take-up amount detection unit 40 is provided. FIG. 9 is a sectional view taken along line IX—IX of FIG. 8.

The film take-up amount detection unit 40 is provided with a photoelectric sensor 41 and a detect disk 42. The detect disk 42 is fixed to the tilt guide 22b. The photoelectric sensor 41 is attached to one side of the guide bracket 25 through a support piece 43 and a sensor bracket 44.

The photoelectric sensor 41 comprises light emitting and receiving elements. The light is blocked when the detect disk 42 is inserted between such elements. When the disk 42 is removed from between such elements, a light receiving signal is generated and converted into an electric signal.

By combining the photoelectric sensor 41 attached to the guide bracket 25 and the detect disk 42 fixed to the tilt guide 22b, the amount of film that has been taken-up can be detected.

Now the operation of the film take-up amount detection unit is explained with reference to FIGS. 10 and 11.

Figure 10:
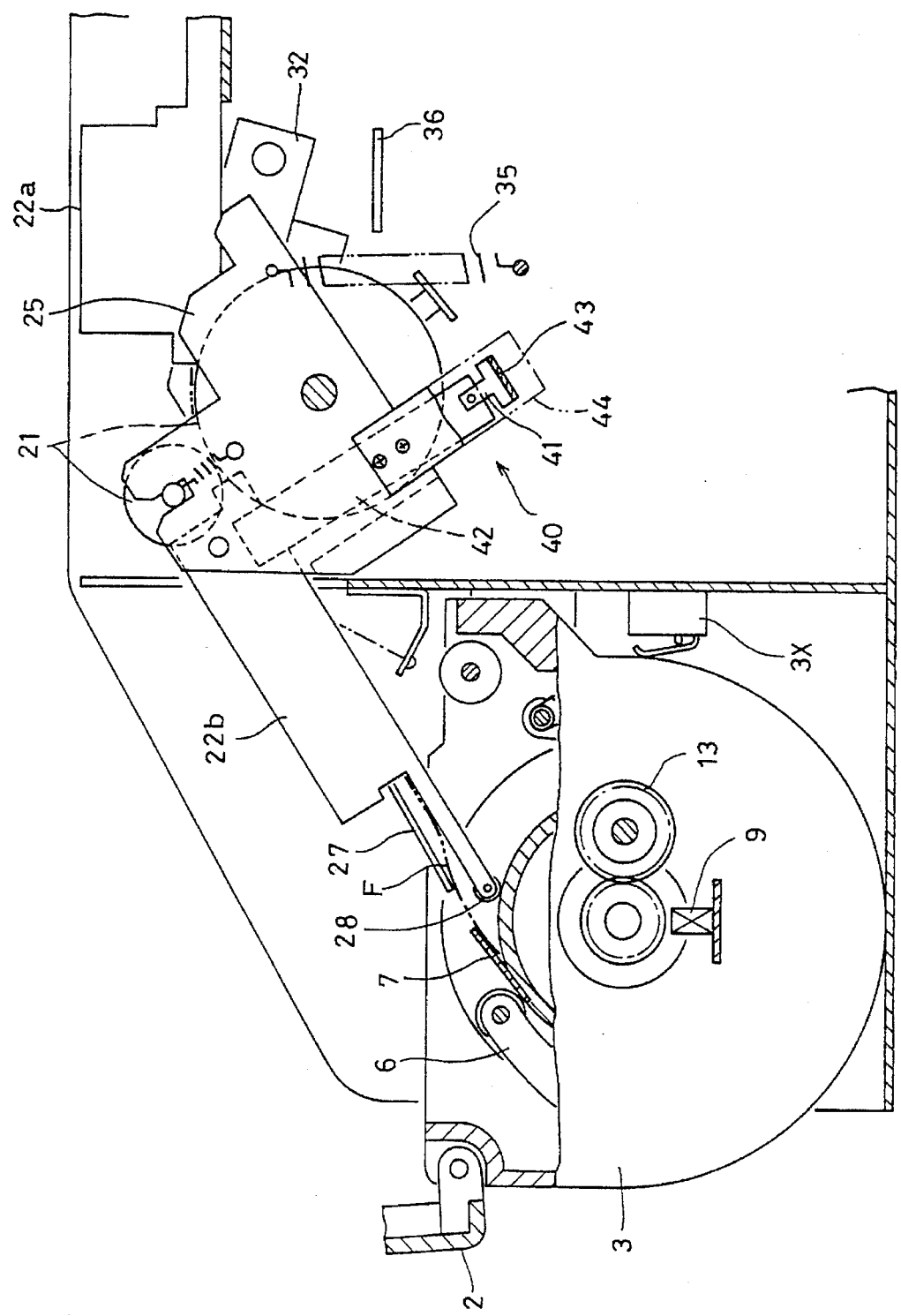
FIGS. 10 and 11 are explanatory views showing how such apparatus operates.
Figure 11:
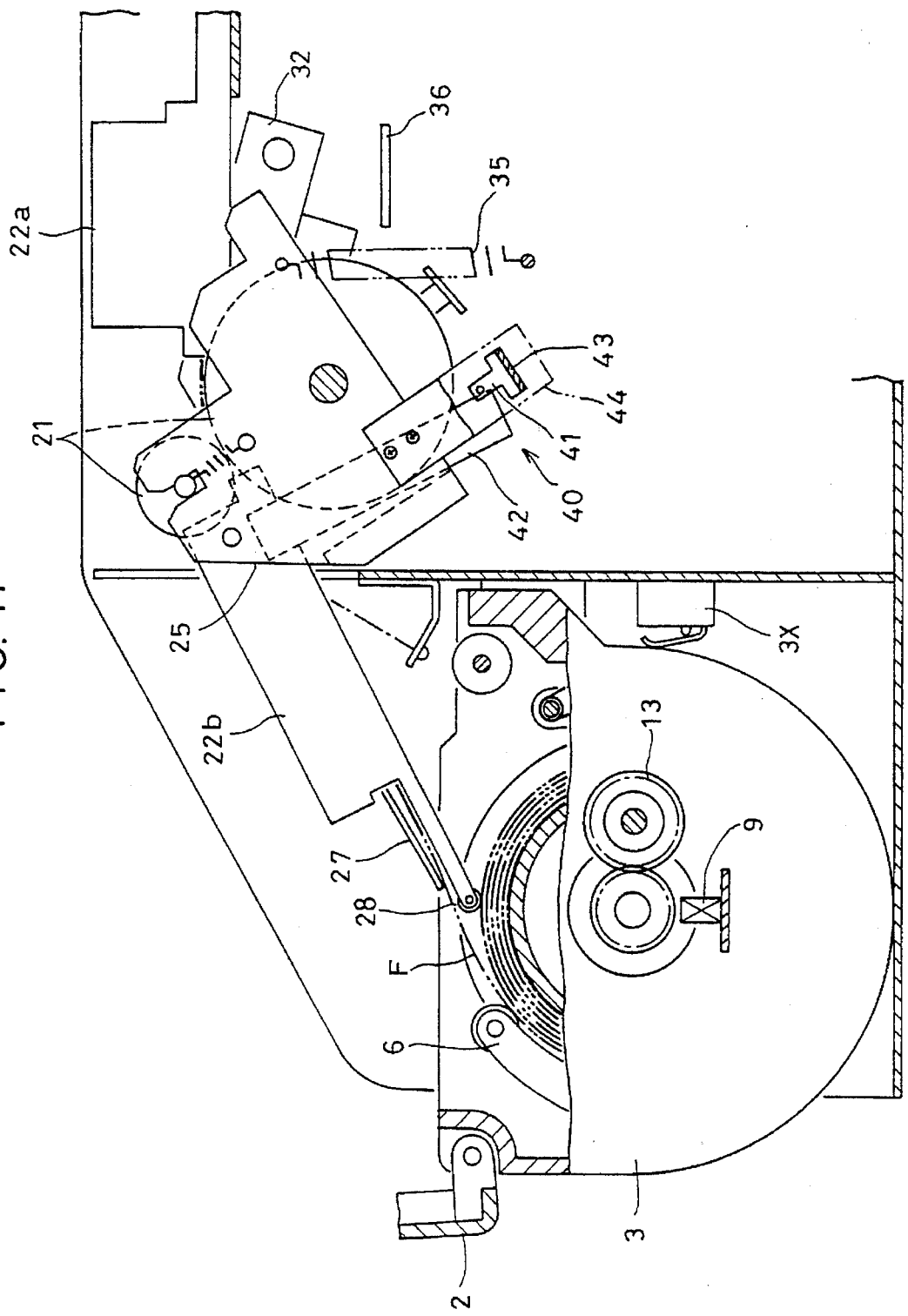

As shown in FIG. 10, when the first web of film F is wound in the continuous film take-up apparatus, the front end of the tilt guide 22b is pivoted down. The film F is fed forward with the guide roller 28 on magazine reel 5.

In this state, the photoelectric sensor 41 pivots downward with the guide bracket 25, whereas the detect disk 42 pivots with the tilt guide 22b. FIG. 10 shows the state in which the leading end of the web of film is about to be wound onto the reel 5. In this state, the photoelectric sensor 41 is blocked by the detect disk 42, although the tilt guide 22b and the guide bracket 25 are slightly inclined with respect to each other compared to the relative positions thereof when they are horizontal.

Thereafter, as the film F is fed to the film magazine 2 by the continuous film take-up apparatus and is wound on the magazine reel 5, the diameter of the film roll will increase gradually. The guide roller 28 provided at the front end of the tilt guide 22b is thus lifted.

In this state, the roll 31 mounted to the detect disk 30 stops the motor 23a while lifting the arm 32, and the toothed plate 33 on the arm is kept in engagement with the gear formed on the guide bracket 25. Thus, the guide bracket does not pivot even if the diameter of the film roll increases. When the diameter of the film roll reaches a predetermined amount and thus the guide roller 28 is lifted, the detect disk 42 which has blocked the light no longer intervenes in the light path of the photoelectric sensor 41. The photoelectric sensor 41 detects that the diameter of the film roll has reached the predetermined amount and outputs a signal. Now the apparatus is reset to the original state shown in FIG. 8. If a film is still being wound up when the photoelectric sensor detects that the diameter of the film roll has reached the predetermined amount, the apparatus will reset to the original state after the taking-up operation has finished.

The film is ordinarily about 1/10 mm thick. Thus, the maximum length of the film taken up on the magazine reel 5 can be estimated beforehand based on the relation between the film length and the diameter of the roll. Therefore, by presetting the position where blocking of the light is ceased, the amount of film that has been taken-up can be detected by use of the movement of the tilt guide 22b.

As described above, by using the film guide (or tilt guide) in this invention also as a detecting arm, the amount of film taken-up can be detected in a simple manner at cost.

What is claimed is:

1. A film take-up apparatus for taking up a plurality of films, said apparatus comprising:

a take-up reel of a film magazine, said reel having a film hold-down plate;

a drive to rotate said reel;

a guide and feed device operable to supply a plurality of films in succession to said reel such that, as said reel is rotated by said drive, the plurality of films are wound in succession on said reel, said guide and feed device including a tilt guide tiltable in a direction toward said reel to an inclined position to place a leading end of a first film under said hold-down plate and to place a leading end of each film other than the first film under a trailing end of a preceding film that has been wound on said reel immediately before such each film, and said tilt guide also being tiltable in a direction away from said reel and operable to lift the trailing end of each film away from said reel to enable the leading end of the next succeeding film to be placed thereunder, an angle of inclination of said tilt guide when in said inclined position thereof changing as the films are wound in succession on said reel; and means for detecting an amount of the plurality of films wound on said reel as a function of the change in said angle of inclination of said tilt guide when in said inclined position thereof.

2. An apparatus as claimed in claim 1, wherein said means is operable to detect a maximum amount of the plurality of films that is to be wound on said reel.

3. An apparatus as claimed in claim 2, wherein said tilt guide is pivoted to a guide bracket, and said means detects said maximum amount by determining a change in relative inclination between said tilt guide and said guide bracket when said tilt guide is in said inclined position thereof.

* * * * *